Figure 1:
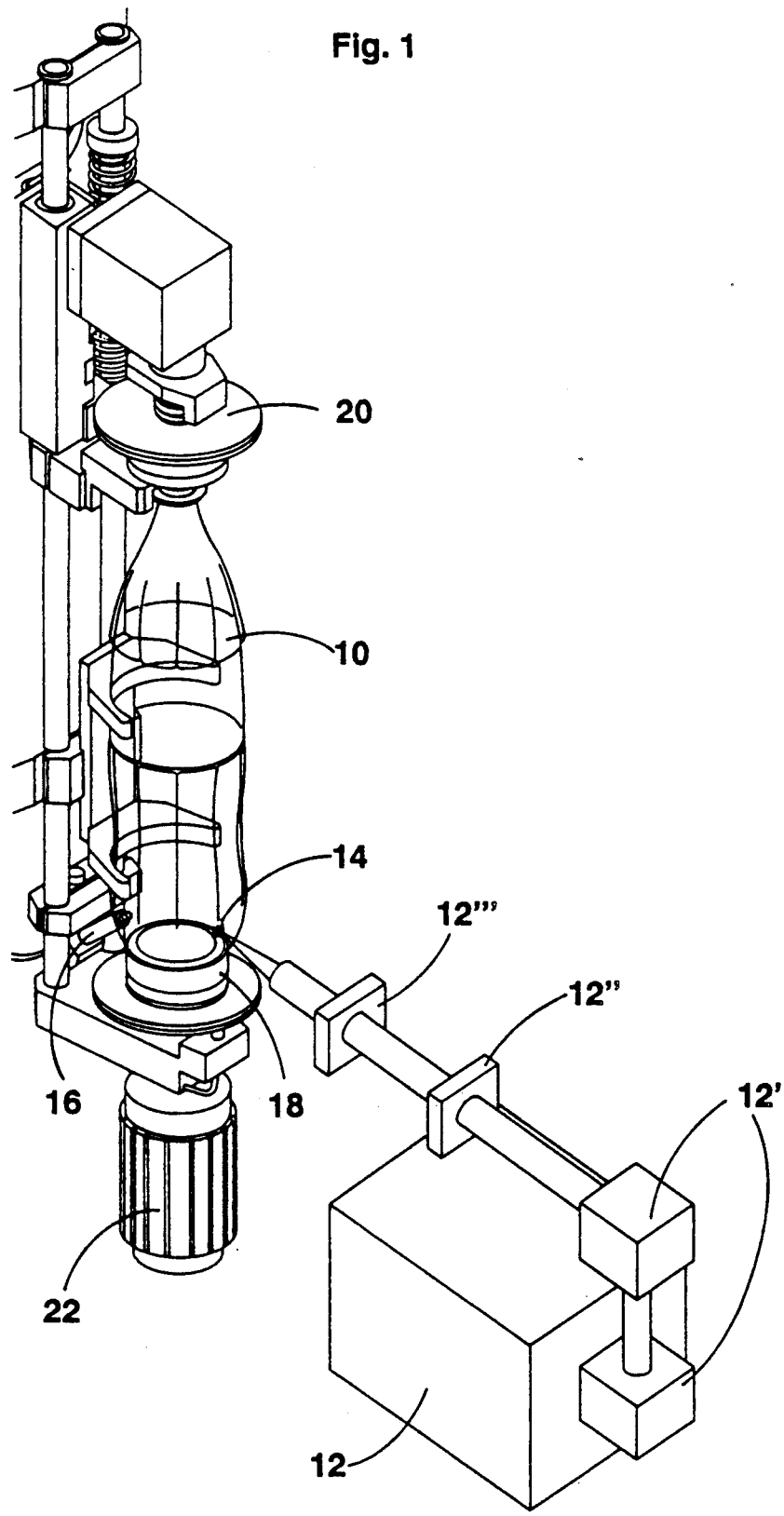

United States Patent [19]
Frei

[11] Patent Number: 4,990,792
[45] Date of Patent: Feb. 5, 1991

[54] METHOD FOR THE APPLICATION AND READING OF, AND BOTTLE WITH OPTICALLY READABLE CODE MARKS

[75] Inventor: Matthias Frei, Wettingen, Switzerland
[73] Assignee: Elpatronic AG, Zug, Switzerland
[21] Appl. No.: 383,875
[22] Filed: Jul. 21, 1989

[30] Foreign Application Priority Data
Aug. 9, 1988 [CH] Switzerland .................. 03004/88

[51] Int. Cl.⁵ .................................. G06K 7/10
[52] U.S. Cl. ............................ 250/566; 235/488; 365/126
[58] Field of Search ............. 250/566, 568; 235/488, 235/489, 462, 375; 219/121.65, 121.66; 365/126; 346/77 E

[56] References Cited
U.S. PATENT DOCUMENTS

| | | | |
|---|---|---|---|
| 3,893,129 | 7/1975 | Endo | 346/77 E |
| 3,949,160 | 4/1976 | Heurtley | 365/126 |
| 4,410,968 | 10/1983 | Frohbach | 346/77 E |
| 4,757,472 | 7/1988 | Magee | 365/126 |

FOREIGN PATENT DOCUMENTS
3722422 3/1989 Switzerland.

Primary Examiner—David C. Nelms
Attorney, Agent, or Firm—McCormick, Paulding & Huber

[57] ABSTRACT

What is described is a method of applying optically readable code marks (14) to the surface of bottles (10) of plastics material or glass by producing depressions in the surface by means of a laser (12) in such a manner that the bottom of each code mark (14) is constructed in the form of a diffusely scattering reflector. A sensor (16) constructed from optical fibres with emitting optical fibres disposed centrally and receiving optical fibres arranged radially is used for the automatic reading of the code marks. The sensor forms an angle of less than 90° with the surface of the bottle so that light is only reflected into the sensor at places on the surface where there are code marks (14). The code marks (14) are easy to apply and can be read reliably.

13 Claims, 3 Drawing Sheets

100 : 1

50 : 1

METHOD FOR THE APPLICATION AND READING OF, AND BOTTLE WITH OPTICALLY READABLE CODE MARKS

The invention relates to a method for the application of optically readable code marks, a bottle with optically readable code marks and a method of reading optically readable code marks of the kind given in the preamble to Patent Claims 1, 12 and 13 respectively.

Code marks which are simple to apply and can be read automatically with great reliability are frequently needed for use in inspection and packaging techniques. The automatically readable bar coding on printed packings is generally known, wherein a sequence of black bars on a white background forms the code marks. These code marks are produced by a printing operation or by removal of the top layer in the case of a material built up from high-contrast layers. The automatic reading of such code marks is effected with a reading head. In the course of this, a beam of light is guided uniformly over the code marks, and the reflected light is recorded and evaluated. The reading beam is absorbed to a greater extent at the strongly contrasting (black) bars and so causes an attenuation in the intensity of the reflected light, which is recorded by a photosensor and evaluated in a following electronic device. The important disadvantages of the known method working with such a bar coding are:

- the bar coding must be strong in contrast and is thus also clearly visible (black bars on a white ground), which is not always desired;
- in the case of homogeneous material, the bar coding has to be printed on, and can only be produced by cutting away in the case of laminated material which is strong in contrast;
- the marking is susceptible to scratches and damage, since the automatic readability is impaired and in many cases made impossible as a result, and
- such a bar coding, which is applied in the form of a layer of enamel or the like, is unsuitable for glass and plastics bottles since it may flake off or be scratched off in use, since such a bar coding cannot be baked onto plastics bottles, many enamels are not compatible with plastics materials, and apart from this, such clearly visible bar codings of black and white bars are rejected for aesthetic reasons in the case of transparent glass and plastics bottles.

The earlier German Patent No. 3722422 of the same Applicants describes an inspection machine for plastics bottles which is intended primarily for the inspection of returned bottles of plastics materials, that is to say of bottles which are returned by the customer and then refilled, which should be achieved about 25 times for each bottle. This is particularly intended for beverage bottles of polyethylene terephthalate or PET. Such bottles are produced on blow moulding machines which contain up to 48 blowing moulds. In the case of such plastics bottles, a dot coding is used for which the St Gobain code common in the glass industry is used. Hitherto, only the blowing mould number has usually been marked on the surface of the bottle by means of this code, and 9 data bits are usually available for this. In order to apply the 9 code marks which represent these data bits, in the wall of each blowing mould there are provided 9 holes in which needles are displaceable. When a needle is flush with the inner wall of the blowing mould, there is no mark, but if the needle projects somewhat into the interior of the mould or is set back somewhat in relation to the inner wall of the mould, the bottle receives a depression or projection in the form of a dot at this point during the blow moulding operation. In the inspection machine according to the same Applicants' earlier patent, an opto-electrical sensor is provided in each inspection station and serves to detect the dot coding on the bottle, in that a beam of light is projected onto the bottle and the beam reflected by the dot coding is transmitted back to a photo-electric receiver which is connected to an electronic evaluation device. With a transmitted and received beam of light directed perpendicularly onto the surface of the bottle, the beam is no longer reflected to the sensor if there is a projection or a depression present since this scatters the light in all directions and allows considerably less light to get back into the sensor than in the case of its absence.

In recent times, it has been required that the coding on a plastics bottle should at least also give the date of manufacture and the manufacturer, and should do this over a period of ten years. It is obvious that the dot coding with needles is unsuitable for this since the operator of the blow moulding machine would have to reset the set coding at up to 48 blow moulding stations every day. This would involve a daily setting time of up to 6 hours and would therefore be much too time-consuming. If, in addition, an error-correcting code had to be used, five check-bit marks would have to be added to the 9 code marks so that with a start bit and end bit, a total of 16 marks would result and hence 16 needles would have to be readjusted, which would be even more time-consuming. If, in addition to this, the code marks extend over half the circumference of the bottle and consist of depressions, which are preferred to the projections because they can be formed with greater certainty in the blowing mould, there would be the risk of the code marks impairing the strength of the bottle. Finally, such dot codes produced by needles are not very reliable to read because scratches in the surface of the bottle can have the same scattering effect as projections or indentations. The reason for this disadvantage is that, during the reading operation, the smooth surface is used as a reflector which produces the wanted signal for the code reading.

It is an object of the invention to improve a method of the kind mentioned at the beginning so that the code marks can be applied more easily and can be read better and more reliably, and in addition to provide a bottle provided with such improved code marks.

According to the invention, this problem is solved in that a laser is used for the application and that the bottom of each code mark is constructed in the form of a diffusely scattering reflector.

The application of the optically readable code marks is greatly simplified by the method according to the invention because the laser merely has to be switched on with an appropriate cadence for their production. No readjustments have to be made at the blowing mould itself because the application of the optically readable code marks to the plastics bottles is only effected after the blowing mould. The resetting time which, as mentioned above, can amount to six hours in the state of the art, amounts to only about five minutes in a comparable case when using the method of application according to the invention. Since both methods according to the invention are carried out on the finished plastics bottles, they can easily also be used in an inspection machine according to the Applicants' earlier patent mentioned above. In this case, the plastics bottles from all 48 blowing moulds are combined to form a common line which leads to packaging or to palletizing. The inspection machine checks each bottle produced and the optically readable code marks are applied by means of lasers. Since the plastics bottles are checked and inscribed directly, it is known later which bottle was produced by which manufacturer, in which line and in which year. If manufacturing faults or material faults occur later, the occurrence of faults can be detected statistically in the case of returned bottles as a result of the fact that the code marks are read again and again during later inspections. This statistical detection can be utilized to improve production.

Although the optically readable code marks applied by the method according to the invention preferably have the form of bars, nevertheless these consist of depressions which do not simply have a surface at the bottom but a certain controlled pattern which has a certain reflectivity as a result of which the code marks differ distinctly from scratches or the like, which have considerably less reflectivity. The optically readable code marks applied by means of the laser are only discernable to the human eye on looking very closely so that they do not even disturb the aesthetic effect of the bottle.

Advantageous developments of the invention form the subject of the sub-claims.

For the marking, preferably either numerous depressions in the form of the desired code marks are applied to the surface, that is to say burnt in, by a beam of a pulsed laser focussed on the surface of the bottle, or an unfocussed laser beam is guided through an appropriately constructed mask onto the surface of the bottle to be marked so that a plurality of round or linear depressions (arranged parallel or in a diamond shape) are introduced simultaneously into the surface, in the form of the desired code marks. It is common to all these code marks that they are depressions which have a pattern of reflecting surfaces which can later be used as reflecting surfaces producing a controlled reflectivity during the automatic reading, that is to say act altogether like a "cat's-eye". The dots or lines which form the pattern make the code marking easier to read than a surface which has simply been cut away.

In a particularly appropriate manner, the pattern can also be produced with a mask in such a manner that a screen (similar to a milk or coffee sieve) is arranged over its openings.

The patterning achieved has also made it possible to provide the method of reading according to the invention, which ensures a particularly satisfactory code reading reliability since it is not the surface of the bottle but the bottom of the marks which is used as a reflector. A preferred angle for the reading beam is 42°. At the same time, the angle of incidence of the light may be the same as the angle of reflection of the light, or the angle of reflection of the light can be the complementary angle with respect to a perpendicular onto the surface of the bottle. In the first case mentioned, the sensor contains transmitting and receiving optical fibres whereas in the second case only transmitting optical fibres are provided at the angle of incidence and only receiving optical fibres at the angle of reflection.

Examples of embodiment of the invention are described in more detail below with reference to the drawings.

Figure 3:
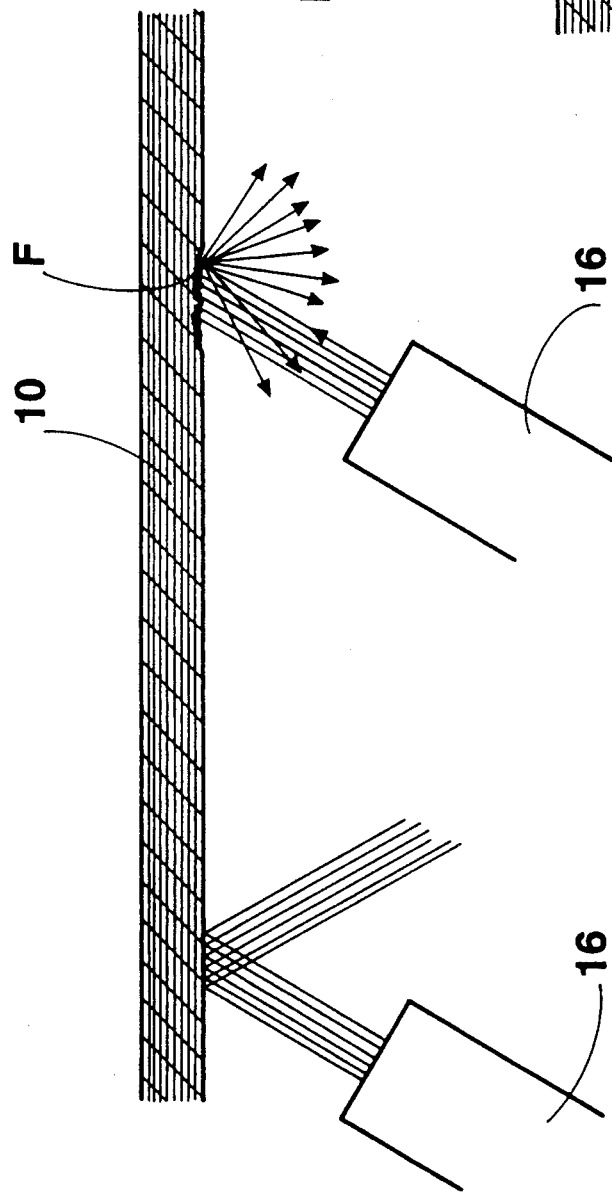
Figure 2:
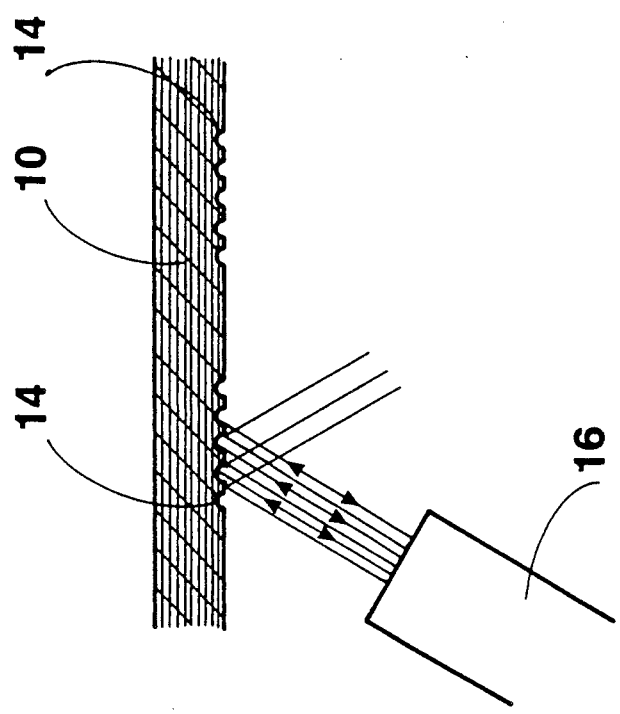
Figure 4:
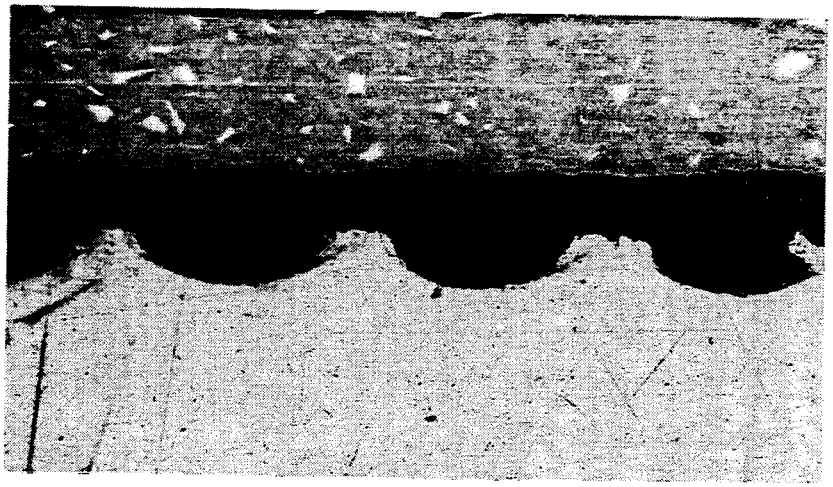
Figure 5:

FIG. 1 shows a station for the inspection of plastics bottles and a laser for applying optically readable code marks, FIGS. 2 and 3 show sketches to explain the method according to the invention for reading code marks, and FIGS. 4 and 5 show in a transverse micrograph and in plan view, and with enlargements of 100 and 50 times respectively, photographs of code marks produced with the laser.

FIG. 1 shows a station of the turn-table of an inspection machine for plastics bottles 10. The station is directly opposite a laser 12 for the application of optically readable code marks 14 by means of a 90° beam switcher 12', a mask holder 12" and a focussing unit 12'''. According to FIG. 1, each station has an opto-electrical sensor 16 for reading the code marks 14. The station shown comprises a lower plate 18 and an upper plate 20 between which the bottle 10 is clamped and can be set in rotation by means of an electric motor 22. The motor 22 is provided as a drive instead of a planet wheel meshing with a sun wheel (see the same Applicants' earlier patent), because during the marking operation, the station stands still but the bottle has to rotate about its axis. The laser 12 could also be disposed on the stationary sun wheel (not illustrated) and a beam switching system 12',12",12''' be associated with each station. In this case, instead of the motor 22, the otherwise usual planet wheel (not illustrated) would be provided, the teeth of which engage in the sun wheel so that the bottle is set in rotation by the rotation of the turn-table.

If the laser 12 is used not in an inspection machine but in an apparatus (not illustrated) in which the plastics bottles 10 are merely marked individually, this apparatus could have the same construction as the station illustrated in FIG. 1. The only difference would be that the sensor 16 would not be necessary. The devices for supplying current to and controlling the laser and the motor 22 have not been illustrated for the sake of clarity.

Code marks, preferably in the form of bars, are burnt into the surface of the plastics bottle 10 by means of the laser 12. Three of these bar-shaped code marks 14 are illustrated in FIG. 1. While the plastics bottle 10 rotates in front of the laser 12, the code marks 14 are produced over about half the circumference of the plastics bottle. The shape of the bar-shaped code marks 14 is here produced by means of an opening in a mask (not illustrated). The code marks 14 are applied one after the other by displacing the mask in the beam of the laser 12 or by appropriate triggering of the latter. The mask may also be provided with a plurality of openings so that the code marks 14 can be applied in groups. What is important about the invention is that the code marks applied have a pattern of projections or depressions at the bottom (see FIGS. 2, 4 and 5), so that a plurality of surfaces is present in the fine geometry, which surfaces reflect the light in a direction which forms an angle different from 90° with the surface of the bottle. In order to achieve the pattern, each opening in the mask is covered by a line grating, a point lattice or simply a filter (for example the above-mentioned milk or coffee filter), in order to produce a fine line grating or a fine dot raster at the bottom of the code mark 14 as a result.

A gas laser or a YAG laser could be used as a laser and the code marks can be applied through the mask by a laser beam with a uniform rectangular mode. Instead of a mask with a grating or screen disposed in front of its opening, a vector-controlled YAG or gas laser may also be used, with which a large number of dots can be produced. Fundamentally, the dot or line raster acts like the prisms of the cat's-eye on a bicycle or the like.

In the form of embodiment illustrated in FIG. 1, plastics bottles can be checked for a number of parameters, namely whether bottom, neck and mouth are at right angles to the axis of the bottle, whether the height and volume of the bottle have the correct values etc. If the inspection machine is used in connection with a blow moulding machine, code marks 14 are produced by the laser 12 and may subsequently be checked for correctness by means of the sensor 16. If it is a question of returned bottles, the laser 12 is usually not in operation and the sensor 16 merely reads the code marks in order to determine manufacturer, date of manufacture etc. The laser 12 may, however, be additionally used, for example in order to apply an additional code mark on each inspection operation, from which the number of refillings of the plastics bottle 10 can be determined later.

If the code marks to be introduced have to be changed daily, for example because in order to set up the date, in the case of a vector-controlled or electronically triggered gas laser, an intervention is merely made in the control. In the case of a laser with which a mask is used, a new mask is simply punched. For this purpose, a small punching apparatus may be installed beside the laser, in which apparatus, the operator can punch the masks as required. In this case, too, the stoppage time of the machine necessary for the readjustment of the code marks is only a few minutes.

FIGS. 2, 4 and 5 show in cross-section, in a transverse micrograph and in plan view, a portion of the wall of the plastics bottle 10 with the code marks 14. The bottom of each code mark 14 has been produced in the form of a diffusely scattering reflector with controlled reflectivity by the laser 12. Furthermore, in FIG. 2, the sensor 16 is illustrated which forms an angle, for example of 42°, with the surface (more precisely with a tangent on the surface) of the plastics bottle 10. The sensor 16 transmits light via transmitting optical fibres onto the surface of the plastics bottle 10. If there is no code mark 14 present, no light is reflected back into the sensor 16 by the smooth surface of the plastics bottle 10. If, as shown in FIG. 2, a mark 14 is present, light is reflected at this and is conveyed via receiving optical fibres arranged coaxially with the transmitting optical fibres back through the sensor 16 to a photoelectric receiver (not illustrated). Focussed light scanners, that is to say sensors without optical fibres, could also be used.

FIG. 3 shows, on the left, the case where there is no code mark 14 present on the surface of the plastics bottle 10. There the angle of reflection of the beam of light is the same as its angle of incidence so that no light is reflected back into the sensor 16. On the right in FIG. 3, a fault F is indicated which consists of a scratch or the like and does not have the dot raster of the code marks 14 at the bottom, for which reason the reflected radiation is scattered considerably more diffusely than at a code mark so that less light arrives back in the sensor 16 than in the example illustrated in FIG. 2. At the same time, the fact must not be overlooked that a scratch or similar defect is generally more or less one-dimensional whereas the code marks 14 are preferably areas and can therefore scarcely be impaired in their information content by a scratch or the like. As a result of the method described here, not only can the code marks 14 be applied in a simple manner but can also be read reliably on reusable plastics bottles after repeated use thereof.

Although the sensor 16 composed of optical fibres with transmitting optical fibres arranged centrally and receiving optical fibres arranged radially, is preferably used for the automatic reading of the code marks 14, nevertheless transmission and reception can also be carried out separately. In this case, the receiver forms the same angle with the surface of the plastics bottle 10 as the transmitter, and this angle has a certain value, for which 42° was given as an example above, depending on the sensor. The form of embodiment with emitting and receiving optical fibres arranged coaxially is preferred, however, because in this case the code marks can be read more reliably. Since, in the region where there is no mark (plane, smooth surface), the reflected light does not enter the receiving optical fibres, whereas where there are marks the reflecting surfaces of the depression convey the light into the receiving optical fibres, scratches and superficial damage cannot be wrongly interpreted as marks. It is actually highly improbable that damage or scratches will have a large number of appropriately arranged reflecting surfaces. Even damage to the surface at the code marks themselves only impairs the readability if it is correspondingly large in area and reaches as deep into the material as the code mark itself, that is to say if the code mark has been almost completely removed.

Although the preferred example described is directed towards bottles of plastics material, nevertheless the methods according to the invention are also suitable without more ado for bottles of glass.

I claim:

1. A method of applying optically readable code marks to the surface of bottles, particularly of plastics material, by producing depressions in the surface, characterized by applying each code mark to the surface of the bottle by means of a laser such that the bottom of each code mark is constructed in the form of a diffusely scattering reflector with controlled reflectivity.

2. A method according to claim 1, characterized in that the bottom of each code mark is produced in the form of a pattern of projections or depressions.

3. A method according to claim 1, characterized in that the code marks are applied to a bottle surface one after the other in the form of bar-shaped code marks.

4. A method according to claim 1, characterized in that the code marks are applied to a bottle surface in groups in the form of bar-shaped code marks.

5. A method according to claim 1, characterized in that the code marks are so applied that, in their fine geometry, they have a plurality of surfaces which reflect the light preferentially in a direction which forms an angle different from 90° with the surface of the bottle.

6. A method according to claim 1, characterized by applying the code marks by projecting a laser beam with a uniform rectangular mode through a mask.

7. A method according to claim 1, characterized by applying the code marks in the form of a plurality of depressions in the surface of a bottle by a focussed, vector-controlled beam of a pulsed laser.

8. A method according to claim 1, characterized by projecting the laser through a mask with a line grating to apply a fine line grating.

9. A method according to claim 1, characterized by projecting the laser through a mask with a point lattice to apply a fine dot raster.

10. A method according to claim 1, characterized by projecting the laser through a screen or filter to apply a fine dot raster.

11. A method according to claim 6, characterized in that a mask is used having openings which are covered by a fine screen or filter.

12. A bottle, particularly of plastic material, having optically readable code marks in the form of depressions in the surface of the bottle, characterized in that the bottom of each code mark (14) is produced in the form of a diffusely scattering reflector having a controlled reflectivity.

13. A method of reading optically readable code marks on the surface of a bottle characterized by providing optically readable code marks which form a diffusely scattering reflector having controlled reflectivity; reading the code marks with a beam that is transmitted at an angle of less than 90° onto the surface of the bottle and intercepting and evaluating a beam reflected at the same angle.

* * * * *